June 10, 1958 M. R. MANTZ ET AL 2,838,659

RADIO RECEIVER AUTOMATIC GAIN CONTROL

Filed June 28, 1954

INVENTORS
MARIUS ROBERT MANTZ
JAAP STARREVELD

BY [signature]

AGENT

United States Patent Office 2,838,659

Patented June 10, 1958

2,838,659

RADIO RECEIVER AUTOMATIC GAIN CONTROL

Marius Robert Mantz and Jaap Starreveld, Hilversum, Netherlands, assignors, by mesne assignments, to North American Philips Company, Inc., New York, N. Y., a corporation of Delaware Application June 28, 1954, Serial No. 439,814

Claims priority, application Netherlands July 2, 1953

7 Claims. (Cl. 250—20)

Figure 1:
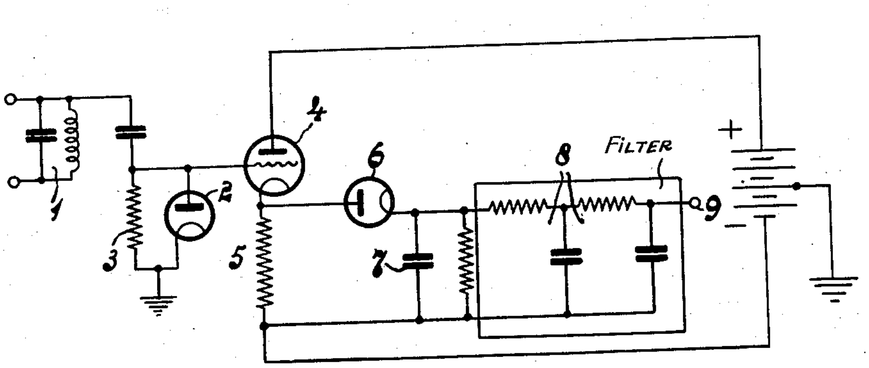

The present invention relates to radio receivers. More particularly, the invention relates to radio receivers comprising an arrangement for deriving a control voltage from the received intermediate or high frequency signal voltage, which control voltage is supplied to the grids of one or more amplifier tubes of the receiver to enable the amplification of these tubes to be controlled. Usually the control voltage is directly derived from the high frequency or intermediate frequency signal voltage by means of detection.

When an amplitude modulated signal is detected, the detected voltage contains a direct voltage component, which is approximately equal to the peak value of the mean carrier wave voltage, and an alternating voltage representing the modulation. If impulse disturbances occur, the detected signal also contains pulses the height of which is governed by the ratio between the carrier wave and the disturbance pulses, and the duration of which is governed by the band-width of the receiver and the dimensions of the detector circuit.

From the said direct voltage the control voltage for the amplification of the amplifier tubes is derived. In the case of normal speech modulation the modulation is symmetric with respect to the non-modulated carrier wave voltage. The mean carrier wave voltage increased by the mean modulation voltage integrated with respect to time thus provides again the mean carrier wave voltage. This derivation is effected in the filter for the gain control voltage. However, disturbance pulses produce an asymmetry with the result that when disturbance pulses occur the detected modulated voltage integrated with respect to time has a higher value than the mean carrier wave.

Accordingly, it has been found that when the detected signal is used for automatic gain control, the control voltage for the tubes obtained after the detected voltage has been smoothed exceeds the value corresponding with the carrier wave strength in the presence of strong disturbances. Consequently, the signal, which is poorly received to begin with, is additionally attenuated in an undue manner so that its audibility further deteriorates. If disturbance limiters are also provided they will work to less effect.

The object of the invention is to provide a receiver in which the action of pulse disturbances on the control voltage is greatly reduced.

According to the invention the control voltage set up across a resistor is taken therefrom through an asymmetrically conducting element which together with a capacitor connected in series therewith shunts the resistor. In this event the asymmetrically conducting element has a bias voltage such that it carries a certain closed circuit current in the conductive direction.

It should be noted that the use of a rectifier in the direct control voltage circuit is known. It has been proposed to connect the rectifier in such a manner that the direct control voltage circuit exhibits a small time-constant when the direct control voltage decreases, and a large time-constant when the direct control voltage increases. This results in the receiver, in the presence of strong disturbance signals being rendered inoperative during each disturbance signal, and being again rendered operative at the end of each disturbance signal. Such an arrangement may be of special importance in telegraph signal receivers.

The known arrangement is less suited when the disturbances occur as pulses. In addition, the known arrangement has a limitation in that the low frequency alternating voltage component of the detected voltage, which component is provided by the modulation, is distorted by the non-linear time-constant in a manner such that with increase of modulation depth the direct control voltage decreases with the result that undesired phenomena occur.

In the arrangement according to the invention the energy obtained by detection is preferably amplified in a cathode-follower acting as a direct current amplifier and the control voltage is derived from a resistor included in the cathode circuit of said amplifier.

In this connection, it should be noted that it is also known to remove peak disturbances in the low frequency signal by means of a limiting rectifier which carries a certain bias current so that it passes the signal voltage under normal conditions. This arrangement comprises a parallel capacitor connected after the rectifier which is rapidly charged on the occurrence of a peak voltage, in which case the said rectifier has no current supplied to it so that the peak voltage is not transmitted. This is a so-called gradient limiter; in the present invention it is used to reduce the action of the voltage peaks upon the control voltage.

When a cathode-follower is used for the amplification of the detected energy it is necessary to connect the cathode of the tube through a cathode resistance to a comparatively high negative voltage. This permits the amplifying of the control voltage obtained after limiting and smoothing in a cathode-follower, in which event the amplified control voltage is set up at the cathode of the second amplifier.

Figure 2:
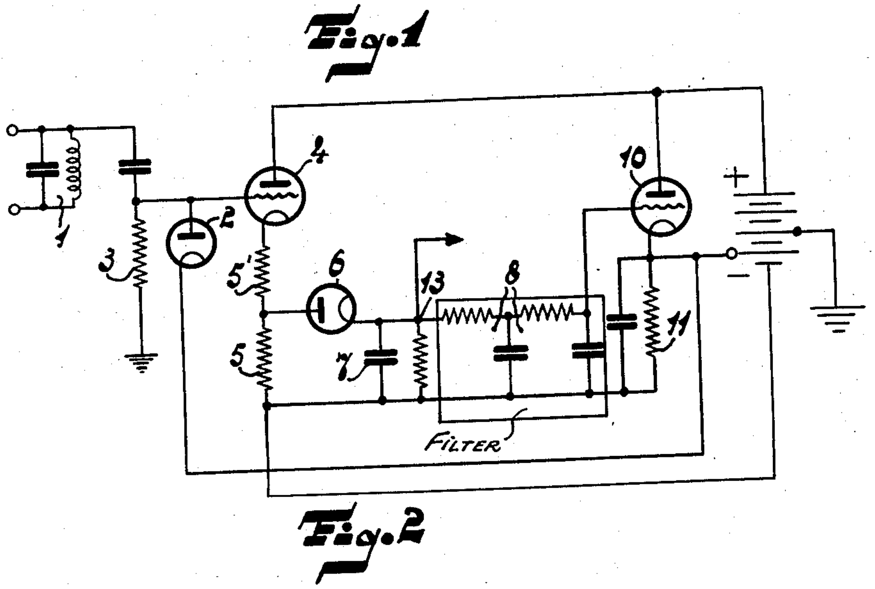

In order that the invention may be readily carried into effect, it will now be described with reference to the accompanying drawing, wherein:

Fig. 1 is a schematic diagram of an embodiment of the circuit arrangement of the present invention; and Fig. 2 is a schematic diagram of another embodiment of the circuit arrangement of the present invention.

Referring to Fig. 1, reference numeral 1 designates a circuit tuned to the intermediate frequency at which the modulated intermediate frequency oscillations are set up and to which a detector 2, shown here as a diode, is connected through a capacitor. The detected voltage, which consequently contains a direct voltage component corresponding with the intermediate frequency carrier wave, the modulation voltages and interfering peak voltages, is set up across a resistor 3. This is connected between the control grid of an amplifier tube 4 and ground. The amplifier tube 4 is a cathode-follower, the anode of which is directly connected to the positive terminal of the supply source of a voltage of, for example, 250 volts positive with respect to ground and the cathode of which is connected to the negative terminal of said supply source via a resistor 5. The tube 4 acts as a direct current energy amplifier. The voltage set up across the resistor 5 contains all three of said components.

According to the invention, provision is made of a limiting element 6, for example a diode, which is connected parallel with the resistor 5 in series with a capacitor 7, the capacitance of which may be some hundreds of micromicrofarads. In the arrangement shown the peaks are assumed to have a negative polarity. The control voltage is taken from the capacitor 7 and the alternating voltage components are removed in a smoothing filter 8, producing a substantially pure direct control voltage at a terminal 9.

The diode 6 together with the capacitor 7 forms a so-called gradient limiter; that is, rapidly increasing voltages such as interfering peak voltages are effectively rejected, for the rectifier 6 due to its connection to the resistor 5 carries a certain bias current as a result of which its resistance is negligible in the absence of peak voltages. However, if the voltage at the cathode end of the resistor 5 increases very rapidly in a negative sense the capacitor 7 will tend to discharge rapidly. In this event, the discharging current which tends to be produced exceeds the closed-circuit current of the rectifier 6 with the result that this rectifier becomes non-conductive and the peak voltages are not transmitted to the filter 8.

The negative voltage at the end of the resistor 5 not connected to the cathode of the amplifier tube 4 will generally be of the order of 150 volts.

It is possible for the obtained control voltage to be amplified again in a direct current amplifier. Fig. 2 shows an arrangement of this kind. A second amplifier tube 10 is connected similarly to the tube 4 as a cathode-follower, a voltage amplification, however, in this case being produced when the amplified control voltage is taken from the cathode of the tube 10 at 12. The cathode resistor of the tube 4 is divided into two parts 5 and 5' from the common point of which the control voltage is derived. The object of this arrangement is to obtain the correct level of the control voltage. The cathode of the detector diode 2 is connected to the cathode of the tube 10 so that the voltage set up across a resistor 11 acts as a negative voltage in the circuit of the diode 2; this voltage is partly compensated for by the negative supply voltage with the result that a slight negative bias voltage is obtained. This arrangement has the advantage that a control voltage is produced only at a predetermined amplitude of the intermediate frequency voltage. The negative bias voltage of the diode 2 rapidly decreases with increasing amplitude with the result that in the detector circuit no distortion is produced. Preferably the tubes 2 and 10 are combined to form a single tube.

While the invention has been described by means of specific examples and in specific embodiments, we do not wish to be limited thereto, for obvious modifications will occur to those skilled in the art without departing from the spirit and scope of the invention.

What is claimed is:

1. An electrical circuit arrangement comprising input means for a carrier wave, a resistor element, detector means for said carrier wave coupled to said input means for producing across said resistor element a unidirectional voltage having an average intensity as determined by the intensity of said carrier wave and undergoing intensity variations as determined by non-symmetrical variations of the intensity of said carrier wave, a unidirectionally conducting element and a capacitor connected in series circuit arrangement, said series circuit being connected in shunt with said resistor element and said unidirectionally conducting element being poled in a conductive sense with respect to said voltage thereby to charge said capacitor to a biasing voltage substantially equal to the said average intensity of said unidirectional voltage, and output circuit means coupled to said resistor element through said unidirectionally conducting element, said unidirectionally conducting element being rendered substantially non-conductive upon intensity variations of said unidirectional voltage to values less than said average intensity produced by said non-symmetrical variations of said carrier wave.

2. An electrical circuit arrangement comprising input means for a carrier wave, a resistor element, detector means for said carrier wave coupled to said input means for producing across said resistor element a unidirectional voltage having an average intensity as determined by the intensity of said carrier wave and undergoing intensity variations as determined by non-symmetrical variations of the intensity of said carrier wave, said last-mentioned means comprising a cathode follower tube system, said resistor element being connected in the cathode circuit of said system, a unidirectionally conducting element and a capacitor connected in series circuit arrangement, said series circuit being connected in shunt with said resistor element and said unidirectionally conducting element being poled in a conductive sense with respect to said voltage thereby to charge said capacitor to a biasing voltage substantially equal to the average intensity of said unidirectional voltage, and output circuit means coupled to said resistor element through said unidirectionally conducting element, said unidirectionally conducting element being rendered substantially non-conductive upon intensity variations of said unidirectional voltage to values less than said average intensity produced by said non-symmetrical variations of said carrier wave.

3. An electrical circuit arrangement comprising input means for a carrier wave, a resistor element, detector means for said carrier wave coupled to said input means for producing across said resistor element a unidirectional voltage having an average intensity as determined by the intensity of said carrier wave and undergoing intensity variations as determined by non-symmetrical variations of the intensity of said carrier wave, a unidirectionally conducting element and a capacitor connected in series circuit arrangement, said series circuit being connected in shunt with said resistor element and said unidirectionally conducting element being poled in a conductive sense with respect to said voltage thereby to charge said capacitor to a biasing voltage substantially equal to the average intensity of said unidirectional voltage, filter means coupled to said resistor element through said unidirectionally conducting element for smoothing the output of said unidirectionally conducting element, said unidirectionally conducting element being rendered substantially non-conductive upon intensity variations of said unidirectional voltage to values less than said average intensity produced by said non-symmetrical variations of said carrier wave, and output circuit means coupled to said filter means.

4. An electrical circuit arrangement comprising input means for a carrier wave, a resistor element, detector means for said carrier wave coupled to said input means for producing across said resistor element a unidirectional voltage having an average intensity as determined by the intensity of said carrier wave and undergoing intensity variations as determined by non-symmetrical variations of the intensity of said carrier wave, a unidirectionally conducting element and a capacitor connected in series circuit arrangement, said series circuit being connected in shunt with said resistor element and said unidirectionally conducting element being poled in a conductive sense with respect to said voltage thereby to charge said capacitor to a biasing voltage substantially equal to the average intensity of said unidirectional voltage, filter means coupled to said resistor element through said unidirectionally conducting element for smoothing the output of said unidirectionally conducting element, said unidirectionally conducting element being rendered substantially non-conductive upon intensity variations of said unidirectional voltage to values less than said average intensity produced by said non-symmetrical variations of said carrier wave, amplifying means coupled to said filter means for amplifying the output of said filter means, said amplifying means comprising an amplifier tube and a second resistor element connected between the cathode of said amplifier tube and a point of negative potential, and output circuit means coupled to the junction of said cathode and said second resistor element.

5. An electrical circuit arrangement comprising input means for a carrier wave, detector means for said carrier wave coupled to said input means for producing a first unidirectional voltage having an average intensity as determined by the intensity of said carrier wave and undergoing intensity variations as determined by non-symmetrical variations of the intensity of said carrier wave, a cathode follower tube system coupled to said means for producing a unidirectional voltage, a resistor element connected in the cathode circuit of said cathode follower system for producing a second unidirectional voltage having an intensity as determined by the intensity of said first unidirectional voltage, a unidirectionally conducting element and a capacitor connected in series circuit arrangement, said series circuit being connected in shunt with said resistor element and said unidirectionally conducting element being poled in a conductive sense with respect to said second voltage thereby to charge said capacitor to a biasing voltage substantially equal to the average intensity of said second unidirectional voltage, filter means coupled to said resistor element through said unidirectionally conducting element for smoothing the output of said unidirectionally conducting element, said unidirectionally conducting element being rendered substantially non-conductive upon intensity variations of said second unidirectional voltage to values less than said average intensity produced by said non-symmetrical variations of said carrier wave, and output circuit means coupled to said filter means.

6. An electrical circuit arrangement comprising input means for a carrier wave, detector means for said carrier wave coupled to said input means for producing a first unidirectional voltage having an average intensity as determined by the intensity of said carrier wave and undergoing intensity variations as determined by non-symmetrical variations of the intensity of said carrier wave, a cathode follower tube system coupled to said means for producing a unidirectional voltage, a resistor element connected in the cathode circuit of said cathode follower system for producing a second unidirectional voltage having an intensity as determined by the intensity of said first unidirectional voltage, a unidirectionally conducting element and a capacitor connected in series circuit arrangement, said series circuit being connected in shunt with said resistor element and said unidirectionally conducting element being poled in a conductive sense with respect to said second voltage thereby to charge said capacitor to a biasing voltage substantially equal to the average intensity of said second unidirectional voltage, filter means coupled to said resistor element through said unidirectionally conducting element for smoothing the output of said unidirectionally conducting element, said unidirectionally conducting element being rendered substantially nonconductive upon intensity variations of said second unidirectional voltage to values less than said average intensity produced by said non-symmetrical variations of said carrier wave, amplifying means coupled to said filter means for amplifying the output of said filter means, said amplifying means comprising an amplifier tube and a second resistor element connected between the cathode of said amplifier tube and a point of negative potential, and output circuit means coupled to the junction of said cathode and said second resistor element.

7. An electrical circuit arrangement comprising input means for a carrier wave, means coupled to said input means for producing a first unidirectional voltage having an intensity as determined by the intensity of said carrier wave, said last-mentioned means comprising a first unidirectionally conducting element having an anode and a cathode, said anode being coupled to said input means, a cathode follower system coupled to said means for producing a first unidirectional voltage, a first resistor element connected in the cathode circuit of said cathode follower system for producing a second unidirectional voltage having an intensity as determined by the intensity of said first voltage, a second unidirectionally conducting element and a capacitor connected in series circuit arrangement, said series circuit being connected in shunt with said first resistor element and said second unidirectionally conducting element being poled in a conductive sense with respect to said second voltage, filter means coupled to said first resistor element through said second unidirectionally conducting element for smoothing the output of said second unidirectionally conducting element, amplifying means coupled to said filter means for amplifying the output of said filter means, said amplifier means comprising an amplifier tube and a second resistor element connected between the cathode of said amplifier tube and a point of negative potential, the cathode of said first unidirectionally conducting element being connected to the junction of the cathode of said amplifier tube and said second resistor element, and output circuit means coupled to the junction of the cathode of said amplifier tube and said second resistor element.

References Cited in the file of this patent

UNITED STATES PATENTS

| | | |
|---|---|---|
| 2,221,728 | Travis | Nov. 12, 1940 |
| 2,240,593 | Wilson | May 6, 1941 |
| 2,536,051 | Frank et al. | Jan. 2, 1951 |
| 2,546,918 | Branson | Mar. 27, 1951 |
| 2,569,289 | Clark | Sept. 25, 1951 |
| 2,594,916 | Hulnac | Apr. 29, 1952 |
| 2,638,538 | Ruben | May 12, 1953 |